United States Patent
Ishimaru et al.

(10) Patent No.: US 9,626,765 B2
(45) Date of Patent: Apr. 18, 2017

(54) POSITION DETECTION DEVICE DETECTING A POSITION OF TARGET OBJECT AND A POSITION DETECTION PROGRAM

(71) Applicants: DENSO CORPORATION, Kariya, Aichi-pref. (JP); NIPPON SOKEN, INC., Nishio, Aichi-pref. (JP); NAGOYA INSTITUTE OF TECHNOLOGY, Showa-ku, Nagoya-shi, Aichi (JP)

(72) Inventors: Kazuhisa Ishimaru, Nagoya (JP); Masayuki Imanishi, Okazaki (JP); Jun Sato, Nagoya (JP)

(73) Assignees: DENSO CORPORATION, Kariya, Aichi-pref. (JP); NIPPON SOKEN, INC., Nishio, Aichi-pref. (JP); NAGOYA INSTITUTE OF TECHNOLOGY, Nagoya, Aichi-pref. (JP)

(*) Notice: Subject to any disclaimer, the term of this patent is extended or adjusted under 35 U.S.C. 154(b) by 0 days.

(21) Appl. No.: 14/414,347
(22) PCT Filed: Apr. 25, 2013
(86) PCT No.: PCT/JP2013/062224
§ 371 (c)(1),
(2) Date: Jan. 12, 2015
(87) PCT Pub. No.: WO2014/010293
PCT Pub. Date: Jan. 16, 2014

(65) Prior Publication Data
US 2015/0199817 A1 Jul. 16, 2015

(30) Foreign Application Priority Data
Jul. 13, 2012 (JP) .................................. 2012-157972

(51) Int. Cl.
*G06T 7/00* (2006.01)
*G01S 5/16* (2006.01)
*G06T 7/20* (2017.01)

(52) U.S. Cl.
CPC ............ *G06T 7/0044* (2013.01); *G01S 5/16* (2013.01); *G06T 7/0075* (2013.01); *G06T 7/206* (2013.01);
(Continued)

(58) Field of Classification Search
None
See application file for complete search history.

(56) References Cited

U.S. PATENT DOCUMENTS

2005/0102070 A1* 5/2005 Takahama .............. G01C 21/26
701/1
2006/0029272 A1 2/2006 Ogawa
(Continued)

FOREIGN PATENT DOCUMENTS

| JP | 2005100278 A | 4/2005 |
|---|---|---|
| JP | 2006047252 A | 2/2006 |
| JP | 2006170993 A | 6/2006 |

OTHER PUBLICATIONS

International Search Report (in Japanese with English Translation) for PCT/JP2013/062224, mailed Jun. 4, 2013; ISA/JP.
(Continued)

*Primary Examiner* — Jason Heidemann
*Assistant Examiner* — Brian Shin
(74) *Attorney, Agent, or Firm* — Harness, Dickey & Pierce, P.L.C.

(57) ABSTRACT

A position detection device obtains image coordinate groups representing a coordinate of a target object in each acquired image having first and second acquired image groups. The first acquired image group has acquired images obtained at an image acquiring timing in a reference period. The second acquired image group has acquired images obtained at an image acquiring timing in the reference period, which is delayed from the image acquiring timing of the first acquired
(Continued)

image group by an asynchronous time. The device performs a Fourier transformation of each of a first locus and a second locus, and calculates a first frequency waveform based on the first locus and a second frequency waveform based on the second locus. The device calculates a position of the target object based on a relationship in which the frequency waveforms are delayed relative to each other by a phase corresponding to the asynchronous time.

10 Claims, 5 Drawing Sheets

(52) U.S. Cl.
CPC ....... *G06T 2200/04* (2013.01); *G06T 2207/10012* (2013.01); *G06T 2207/10021* (2013.01); *G06T 2207/20048* (2013.01); *G06T 2207/20076* (2013.01); *G06T 2207/20081* (2013.01); *G06T 2207/30252* (2013.01)

(56) References Cited

U.S. PATENT DOCUMENTS

| | | |
|---|---|---|
| 2006/0125920 A1 | 6/2006 | Criminisi et al. |
| 2008/0219509 A1* | 9/2008 | White .............. A63B 24/0003 382/107 |
| 2011/0032361 A1* | 2/2011 | Tamir .................. H04N 7/181 348/157 |

OTHER PUBLICATIONS

Shoichi Shimizu, Hironobu Fujiyoshi, Yasunori Nagasaka, Tomoichi Takahashi, "Pseudo Stereo Method for Measuring 3D Position Using Three Cameras", The Japanese Society for Artificial Intelligence Dai 19 Kai SIG-Challenge Kenykukai, May 2, 2004 (May 2, 2004), pp. 6 to 11.

Matsumoto H., Sato J., Sakaue F., Multiview Constraints in Frequency Space and Camera Calibration from Unsynchronized Images, 2010 IEEE Conference on Computer Vision and Pattern Recognition (CVPR), 2010, pp. 1601-1608.

Tomomi Kagami, Fumihiko Sakaue, Jun Sato, Kazutoshi Ishimaru, Masayuki Imanishi, "High Density 3D Reconstruction by Using Asynchronous Multiple Camera", Meeting on Image Recognition and Understanding, (MIRU2012) Aug. 2012, IEICE (The Institute of Electronics, Information and Communication Engineering).

International Preliminary Report on Patentability (in Japanese with English Translation) for PCT/JP2013/062224, issued Jan. 13, 2015; ISA/JP.

* cited by examiner

FIG.1
(a) PRIOR ART
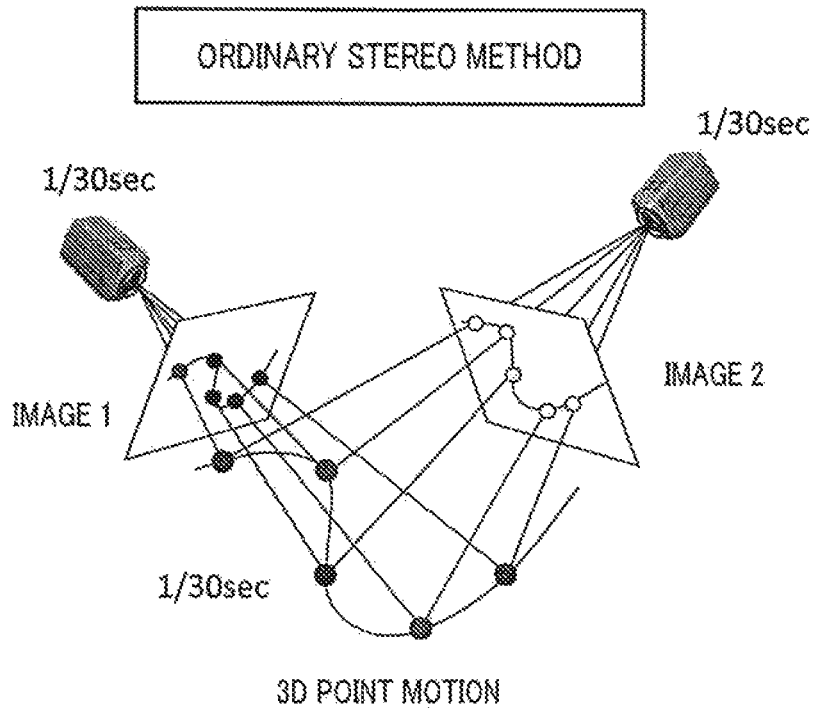
(b)
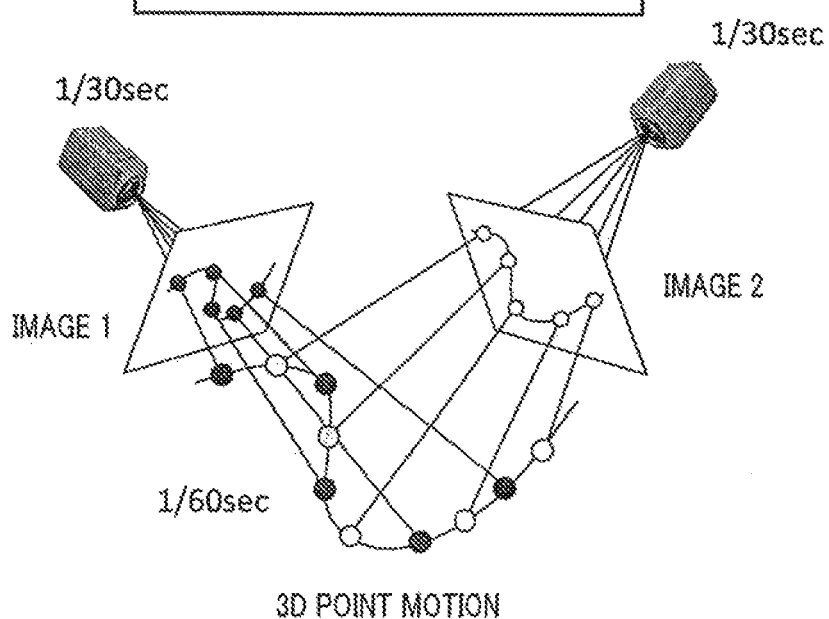

TIME SERIES IMAGES

POSITION DETECTION DEVICE DETECTING A POSITION OF TARGET OBJECT AND A POSITION DETECTION PROGRAM

CROSS REFERENCE TO RELATED APPLICATIONS

This application is a U.S. National Phase Application under 35 U.S.C. 371 of International Application No. PCT/JP2013/062224 filed on Apr. 25, 2013 and published in Japanese as WO 2014/010293 A1 on Jan. 16, 2014. This application is based on and claims the benefit of priority from Japanese Patent Application No. 2012-157972 filed Jul. 13, 2012. The entire disclosures of all of the above applications are incorporated herein by reference.

TECHNICAL FIELD

The present invention relates to position detection devices and position detection programs capable of detecting a position of a target object in a plurality of acquired images.

BACKGROUND ART

There is a known conventional position detection device having a structure using a stereo vision camera. The stereo vision camera detects a position of a target object by using a plurality of cameras which are synchronized to each other. (See patent document 1, for example.)

CITATION LIST

Patent Literature

[Patent document 1] Japanese patent laid open publication No. JP 2006-047252.

SUMMARY OF INVENTION

Technical Problem

However, the conventional position detection device previously described has a problem of it being difficult to improve a resolution thereof relative to an image acquiring period of cameras which are synchronized together. An object of the present invention is to provide a position detection device and a position detection program. The position detection device is capable of detecting a position of a target object in an acquired image on the basis of a plurality of acquired images. A position detection method is realized by the position detection program.
Solution to Problem In accordance with an aspect of the present invention, there is provided a position detection device. The position detection device has an image coordinate group acquiring section and a position calculation section. The image coordinate group acquiring section acquires image coordinate groups which represent coordinates of target objects in each of acquired images. The acquired images have a first acquired image group and a second acquired image group. The first acquired image group has a plurality of acquired images which are acquired at an image acquiring timing in a reference period. This reference period is the predetermined value. The second acquired image group has a plurality of second acquired images acquired at an image acquiring timing in the reference period. The image acquiring timing of the second acquired images and the image acquiring timing of the first acquired images are asynchronous, i.e. there is a variable gap between them by an asynchronous time.

The position calculation section calculates a position of the target object in each of the image coordinate groups on the basis of a relationship in which the first acquired image group and the second acquired image group have been acquired at a different timing delayed relative to each other by the asynchronous time. In the position detection device, a frequency waveform calculation section performs a Fourier transformation of each of a first locus and a second locus and calculates a first frequency waveform and a second frequency waveform, respectively. The first locus represents a transition along a time series of the image coordinate group obtained from the first acquired image group. The second locus represents a transition along a time series of the image coordinate group obtained from the second acquired image group. The first frequency waveform is obtained on the basis of the first locus, and the second frequency waveform is obtained on the basis of the second locus. The position calculation section calculates the position of the target object on the basis of the relationship in which the first frequency waveform and the second frequency waveform have been acquired at a different timing delayed relative to each other by a phase delay corresponding to the asynchronous time.

That is, the position detection device according to the present invention calculates the position of the target object on the basis of the first acquired image group and the second acquired image group having information regarding independent frequency characteristics because they are delayed relative to each other by the asynchronous time. In particular, the position detection device calculates the position of the target object on the basis of the relationship in which each of the waveforms is delayed relative to each other by a phase corresponding to the asynchronous time, where these waveforms are obtained by performing the Fourier transformation of the locus of the image coordinate group in each of the acquired image groups obtained at the image acquiring timing delayed by the asynchronous time.

Accordingly, because the position detection device having the structure previously described can detect the position of the target object at the image acquiring timing at which each of the acquired images is obtained, it is possible to detect the position of the target object with high accuracy as compared with a structure which detects the position of the target object on the basis of acquired image groups synchronized to each other.

The position detection device according to the present invention has the structure which obtains the image coordinate groups on the basis of the first acquired image group and the second acquired image group. It is also possible for the position detection device to have an acquired image group acquiring section (S110) and an image coordinate group extracting section (S140), where the acquired image group acquiring section (S110) acquires the first acquired image group and the second acquired image group, and the image coordinate group extracting section (S140) extracts the image coordinate group from each of those acquired image groups.

Further, it is acceptable for the position detection device according to the present invention to use image coordinate groups on the basis of a third acquired image group and a fourth acquired image group. That is, the structure obtaining the image coordinate group on the basis of the first acquired image group and the second acquired image group is a minimum structure necessary to realize the function of the position detection device according to the present invention. When using the third acquired image group and the fourth acquired image group in addition to the first acquired image group and the second acquired image group, the position detection device can obtain image coordinate groups on the basis of the multiple acquired image groups, and this makes it possible to obtain the effects of the present invention.

Further, it is sufficient for the position calculation section in the position detection device according to the present invention to detect the position of the target object by the following steps. First, a Fourier transformation of each locus (i.e., the first locus and the second locus) is performed to specify a frequency waveform in a frequency space. Further, an inverse Fourier transformation of these frequency waveforms is performed to obtain functions which represent the first locus and the second locus, respectively. Further, a timing value is substituted into these functions in order to obtain the position of the target object at the timing.

A parallel arrangement used in the position detection device indicates that image acquiring central direction of projection cameras are parallel to each other or substantially parallel to each other. In order to achieve this purpose, it is acceptable to use software programs which can realize the functions of the position detection device having the structure previously described.

BRIEF DESCRIPTION OF DRAWINGS

FIG. 1 (a) is a bird's eye view of an ordinary stereo vision method, and FIG. 1 (b) is a bird's eye view of an asynchronous stereo vision method according to the present invention.

DESCRIPTION OF EMBODIMENTS

Figure 2:
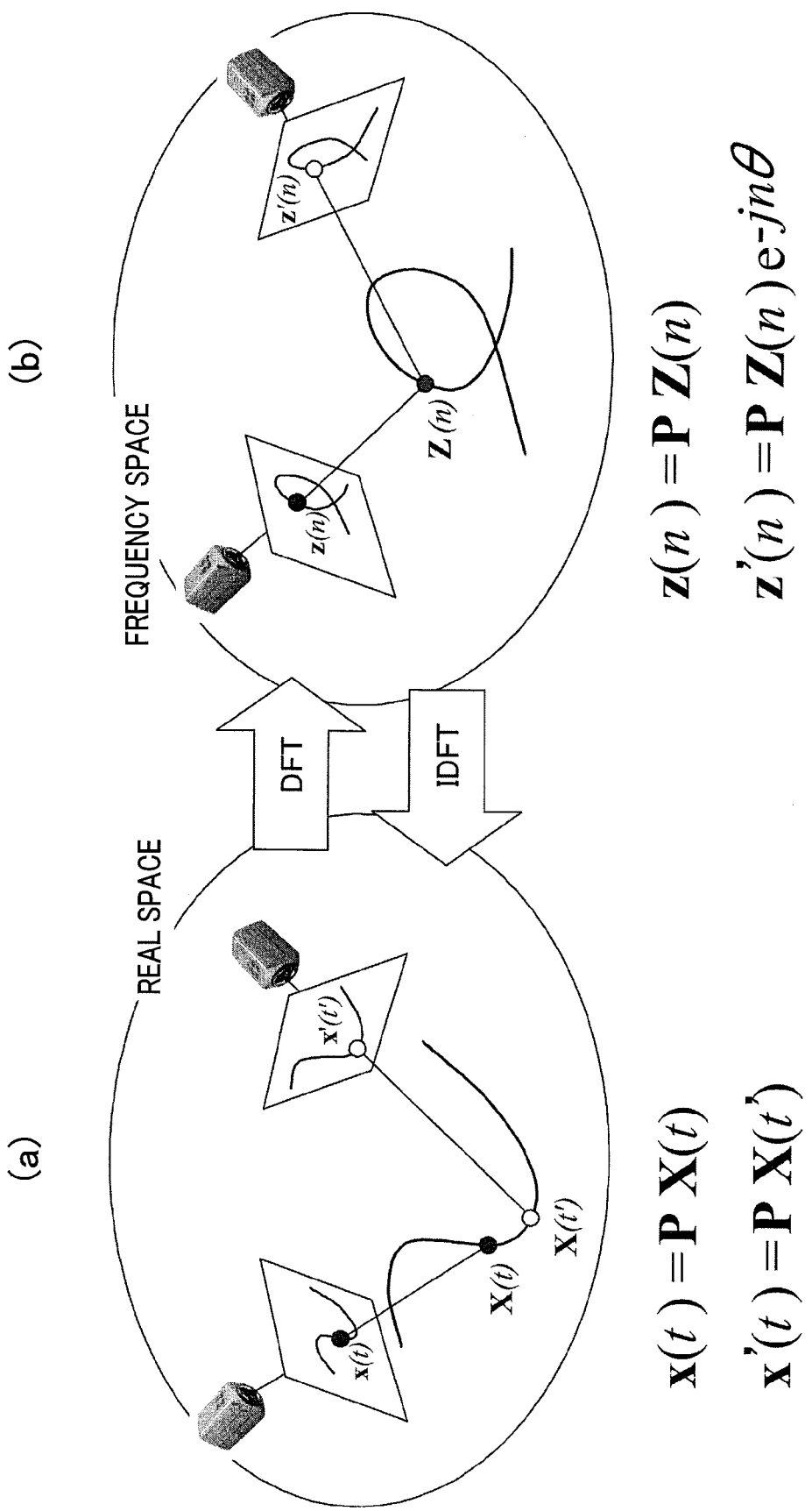
FIG. 2 is a view showing a principle of the present invention, in particular, FIG. 2 (a) is a view showing a locus of a 3D point in a real space, and FIG. 2 (b) is a view showing a projection in which the locus is projected in a frequency space after performing a Fourier transformation of the locus of the 3D point in the real space.

A description will be given of exemplary embodiments according to the present invention with reference to drawings.

Summary of the Present Invention

Various methods have been proposed as three dimensional (3D) reconstruction methods on the basis of camera images. As shown in FIG. 1 (a), a stereo method is an effective method widely used on the basis of stereoscopic images of a plurality of cameras. In order to reconstruct a 3D point from camera images by using the stereo method, it is necessary for these ordinary cameras to project the same point in a 3D space.

For this reason, when a dynamic scene, which is changed in time, is reconstructed, it is necessary to synchronize multiple cameras in order to have the same image acquiring timing. As shown in FIG. 1 (a), because the multiple cameras can observe the same 3D point when these cameras are synchronized to each other and have the same image acquiring timing, points on the obtained images have a correspondence relationship. This makes therefore it possible to reconstruct the 3D point.

However, because it is necessary for the multiple cameras to have the same image acquiring timing, the ordinary stereo reconstruction method cannot reconstruct a high frequency element of not less than a sampling rate of the cameras. When the camera acquires a 3D motion image containing a high frequency element of not less than a half of the sampling frequency of the camera, an aliasing problem occurs in the reconstructed result of the 3D image. This reduces the reconstruction accuracy.

In order to avoid this, as shown in FIG. 1 (b), the present invention (the first exemplary embodiment) proposes the position detection device and the method capable of reconstructing a high frequency element with a high accuracy by using image acquiring timings which are delayed relative to each other between multiple cameras. The ordinary stereo method, which uses the same image acquiring timing, cannot reconstruct a high frequency element. The proposed method (the present invention) is capable of reconstructing more highly frequency element according to increasing of the number of multiple cameras, such as three, four and more cameras having a different image acquiring timing. In the following description, cameras having the same image acquiring timing will be called to as the synchronous cameras, and cameras having a different image acquiring timing will be called to as the asynchronous cameras.

As shown in FIG. 1 (b), it is possible for the stereo cameras having different image acquiring timings which are delayed relative in time to each other in order to obtain high density information when compared with the conventional ordinary stereo cameras which cannot obtain such high density information. Because each of the stereo cameras having the different image acquiring timing acquires an image at a different point in the 3D space, there is no correspondence relationship between the points obtained on the images, and it is accordingly impossible to perform the 3D reconstruction by the ordinary stereo reconstruction method.

However, the present invention performs the 3D reconstruction by using a frequency space under the condition in which the multiple cameras have a different image acquiring timing to each other. The present invention proposes the position detection device and the position detection method capable of reconstructing a 3D motion having a high frequency of more than the sampling frequency of each of the cameras.

At first, as shown in FIG. 2 (a), the present invention performs a Fourier transformation of a locus of a 3D point (at the positions on the obtained image) in a real space, and as shown in FIG. 2 (b), considers the 3D points projected into the frequency space.

Although the cameras having a different image acquiring timing acquire different 3D points in the real space, because the different 3D points in the real space acquired by the cameras can be expressed as a projection model projected at the same 3D point in the frequency space. it is therefore possible to express the projection model which projects the same 3D point in the frequency space. As previously described, because the different 3D points in the real space become the same 3D point in the frequency space, the images acquired by the asynchronous cameras have the correspondence relationship, and this makes it therefore possible to reconstruct the 3D points.

Next, a second exemplary embodiment further expands the projection model in the frequency space previously described. The second exemplary embodiment shows a position detection device and method capable of reconstructing a position of and a distance to the target object by reconstructing a high frequency 3D motion by using asynchronous cameras without limitation of the sampling frequency of these cameras. As a result, the present invention can reconstruct a high frequency element which is 2K/3 times the sampling frequency by using K cameras.

For example, when a 3D reconstruction is performed by using two asynchronous cameras, it is possible to obtain the same 3D reconstruction result of a case which uses a high density sampling frequency of 4/3 times the sampling frequency of ordinary stereo cameras. This effect is greatly increased according to the increasing of the number of the cameras. When three asynchronous cameras are used, it is possible to obtain the 3D reconstruction effect obtained when using a frequency which is twice of the sampling frequency of the ordinary cameras. When six asynchronous cameras are used, it is possible to obtain the 3D reconstruction effect obtained when using a high density sampling frequency which is four times the sampling frequency of the ordinary cameras.

First Exemplary Embodiment

A description will be given of a structure of the present embodiment.

Figure 3:
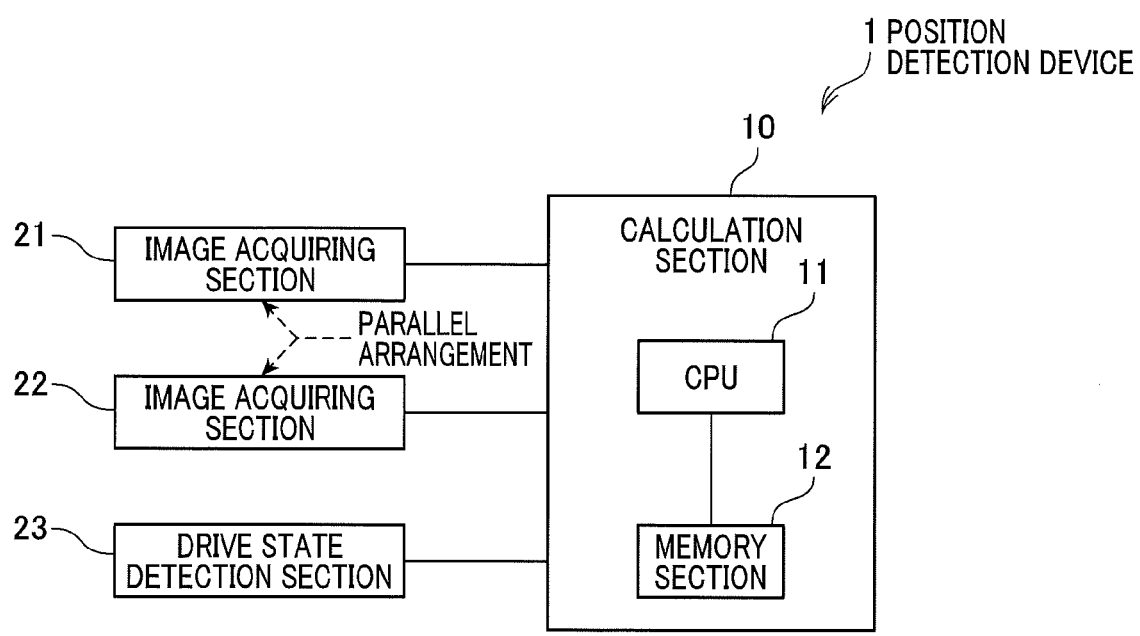
FIG. 3 is a view showing a block diagram of a schematic structure of the position detection device 1 according to the present invention.

As previously described, the position detection device 1 uses asynchronous cameras and has the function of reconstructing a 3D position. For example, the position detection device 1 is mounted on a motor vehicle such as a passenger vehicle. As shown in FIG. 3, the position detection device 1 has a calculation section 10, a plurality of image acquiring sections 21, 22 (i.e. the present exemplary embodiment uses the two image acquiring sections), and a drive state detection section 23.

The calculation section 10 is a known computer (an arithmetic device) having a CPU 11 and a memory section 12 equipped with a ROM, a RAM, etc. The CPU 11 performs processes on the basis of programs (which contain a position detection program) stored in the memory 12.

The image acquiring sections 21 and 22 are affine cameras which are widely known. Each of the image acquiring sections 21 and 22 is arranged at a different location in order to overlap a most part of the image acquiring area to each other. In addition, the image acquiring sections 21 and 22 are arranged parallel to each other so that a direction of central axes of which are arranged parallel to each other. When the image acquiring sections 21 and 22 are affine cameras, like the structure according to the first exemplary embodiment, it is not necessary to arrange these cameras parallel to each other, and acceptable to arrange the image acquiring sections 21 and 22 at a desired location.

Further, although the image acquiring sections 21 and 22 acquire images every reference periods which is the same period (for example, every 30 fps), the image acquiring timings are delayed relative to each other by a predetermined asynchronous time. The image acquiring sections 21 and 22 transmit acquired images to the calculation section 10.

The drive state detection section 23 has a combination of a vehicle speed sensor, a steering angle sensor, etc. capable of detecting a driving state of a motor vehicle. The drive state detection section 23 transmits detected sensor values to the calculation section 10.

Processes of the Present Exemplary Embodiment

The calculation section 10 in the position detection device 1 having the structure previously describe performs a position and distance detection process as follows. For example, the position and distance detection process is initiated when the position detection device 1 receives an electric power, and repeatedly performed every predetermined period.

Figure 4:
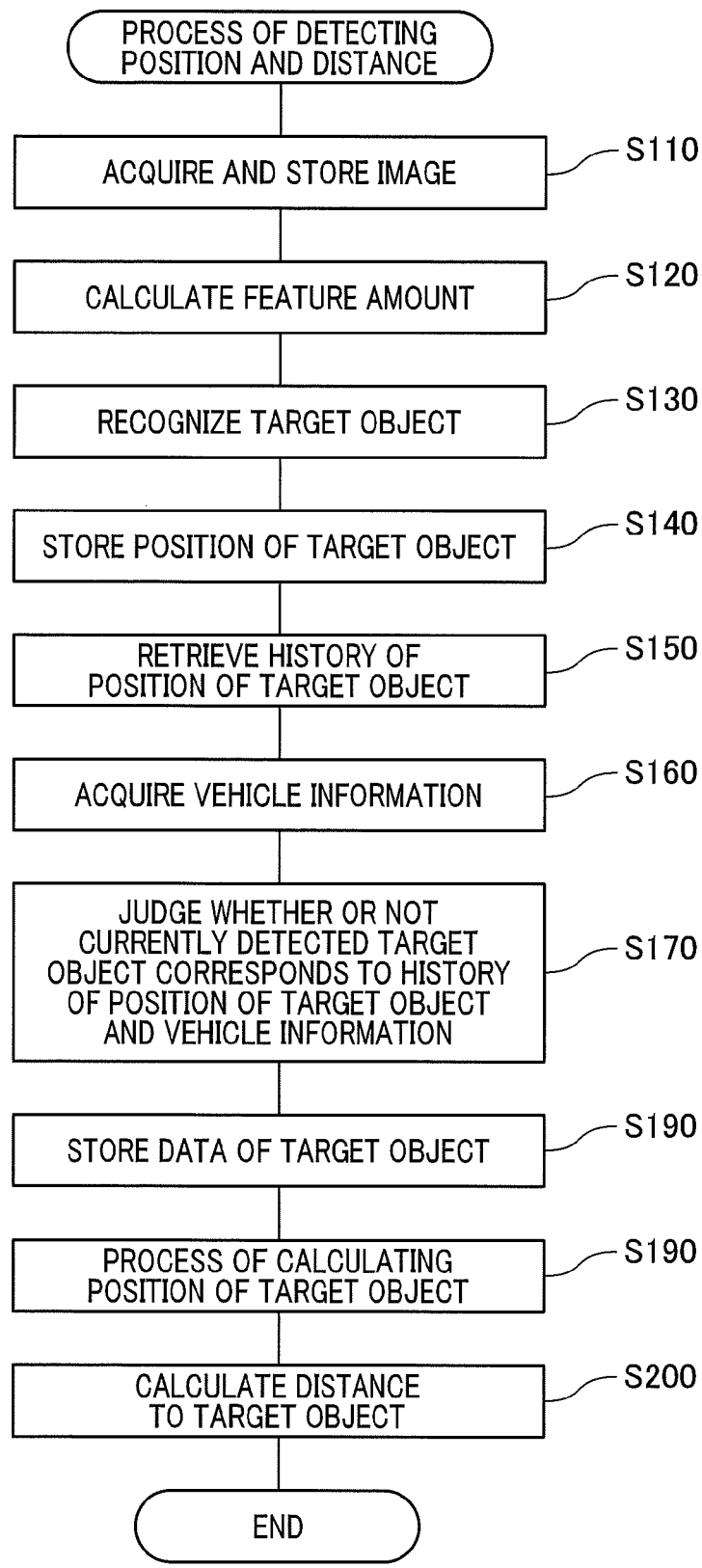
FIG. 4 is a view showing a flowchart of a position detection process performed by a calculation section 10 in the position detection device 1 shown in FIG. 3.

As shown in FIG. 4, the image acquiring section 21 or 22 acquires a newest acquired image and stores the acquired image into the memory section 12 in the position and distance detection process (S110). An image feature amount of the acquired image is calculated (S120). The image feature amount corresponds to a HOG (Histogram of Gradient), etc. from which a brightness gradient and a brightness strength are extracted.

Next, a target object is recognized on the basis of the image feature amount (S130). This recognition process detects the target object in the image by using the function such as a machine learning or a support vector machine, etc. which are generally known.

The position of the target object is temporarily stored into the memory section 12 (S140). Specifically, a coordinate area and an identification number of a target object at the current time on the acquired image. The target object is a motor vehicle, and the position of the target object is an arbitrary coordinate (for example, a position of a tail light). For example, it is acceptable to use, as the position of the target object, a central coordinate of the target object or a coordinate nearest to the image acquiring sections 21 and 22 (or a coordinate nearest to the central point of the image), for example.

Next, a history of the position of the target object is retrieved from the memory section 12 (S150) to obtain the vehicle information (S160). The history of the position of the target object indicates past data regarding the position of a plurality of target objects stored in the memory section 12 every performing the process in step S140. The vehicle information indicates data regarding a vehicle speed representing the driving state of the own vehicle, a relative speed between the own vehicle and the target object, etc. which are stored in the memory section 12 at a necessary timing.

Next, it is judged whether or not the target object currently detected corresponds to the same target object by considering the history of the position of the target object and the vehicle information (the traveling locus of the motor vehicle and the relative speed, etc.) excepting the newest position of the target object and the newest information (S170). This process obtains the position of the target object detected in the past on the basis of the identification number of the target object detected in the past, and detects whether or not the position of the target object currently detected is apart from the position of the target object detected in the past.

The information regarding the target object matched with the stored data is stored as formal data into the memory section 12. When the information regarding the target object which is not matched with the stored data, the data regarding the unmatched target object is deleted from the memory section 12 after the own vehicle drives at a constant distance or a constant period of time is elapsed (S180). A target object position calculation process is performed (S190), which will be explained later.

When a coordinate (a relative position to the image acquiring section 21 or 22) of the target object is determined by the target object position calculation process, a relative distance a distance to the target object) between the coordinate of the target object and the image acquiring section 21 or 22 is calculated (S200). The position detection process is thereby completed.

The target object position calculation process (S190) performs the following process in order to obtain the coordinate of the target object. In the explanation of the process in step S190, the image acquiring section 21 acts as a first camera, and the image acquiring section 22 acts as a second camera.

In this process, a camera projection model is transformed to a frequency space. When the first camera has a camera matrix P (which is known per camera), and a point
[Math. 1]

$$\tilde{X}(t)=[X(t),Y(t),Z(t),1]^T$$

in a 3D space at a timing t is projected to a position
[Math. 2]

$$\tilde{x}(t)=[x(t),y(t),1]^T$$

on an image, the projection equation can be expressed as follows.
[Math. 3]

$$\tilde{x}(t)=P\tilde{X}(t) \quad (1)$$

Next, when the second camera has a camera matrix P' (which is known per camera), and a point
[Math. 4]

$$\tilde{X}(t')=[X(t'),Y(t'),Z(t'),1]^T$$

in a 3D space at a timing t' which is different from the timing t is projected on a point
[Math. 5]

$$\tilde{x}(t')=[x(t'),y(t'),1]^T$$

in the image, the projection equation can be expressed as follows.
[Math. 6]

$$\tilde{x}'(t')=P'\tilde{X}(t') \quad (2)$$

When a difference in sampling timing between the first camera and the second camera is k, it is possible to express the relationship between t and t' as follows.
[Math. 7]

$$k=t-t' \quad (3)$$

When the equation (3) is substituted into the equation (2), the following equation is obtained.
[Math. 8]

$$\tilde{x}'(t')=P'\tilde{X}(t-k) \quad (4)$$

Next, a Fourier transformation of each of both members of the equation (1) and the equation (4) is performed under the assumption in which 3D points are sampled at N timings (N times) by each of these cameras. Because δ(n) becomes 1 when n=0, and δ(n) becomes 0 when n≠0 by the Fourier transformation of homogeneous terms, a 3D point in the frequency space can be expressed by the following equation.
[Math. 9]

$$\tilde{Z}(n)=[X_f(n),Y_f(n),Z_f(n),\delta(n)]^T$$

When a point in the image is expressed by the following equation,
[Math. 10]

$$\tilde{z}(n)=[x_f(n),y_f(n),\delta(n)]^T$$

a discrete Fourier transformation of the projected equation of the first camera can be expressed as follows.

[Math. 11]

$$\tilde{z}(n) = \frac{1}{N}\sum_{i=0}^{N-1}\left(P\tilde{X}(t)e^{-j2\pi\frac{ni}{N}}\right) \quad (5)$$

$$= P\left(\frac{1}{N}\sum_{i=0}^{N-1}\tilde{X}(t)e^{-j2\pi\frac{ni}{N}}\right)$$

$$= P\tilde{Z}(n)$$

In addition, the discrete Fourier transformation of the projected equation of the second camera can be expressed as follows.

[Math. 12]

$$\tilde{z}'(n) = \frac{1}{N}\sum_{i=0}^{N-1}\left(P'\tilde{X}(t-k)e^{-j2\pi\frac{ni}{N}}\right) \quad (6)$$

$$= P'\left(\frac{1}{N}\sum_{i=0}^{N-1}\tilde{X}(t-k)e^{-j2\pi\frac{ni}{N}}\right)$$

$$= P'\tilde{Z}(n)e^{-j2\pi\frac{nk}{N}}$$

The equation (6) can be rewritten as follows.

[Math. 13]

$$e^{j2\pi\frac{nk}{N}}\tilde{z}'(n) = P'\tilde{Z}(n) \quad (7)$$

Because the delay k of the sampling start timing is a known value, $e^{j2\pi nk/N}$ can be considered as a constant value at each sampling timing n. When

[Math. 14]

$$e^{j2\pi\frac{nk}{N}} = \lambda(n),$$

it is possible to rewrite the equation (7) with the following equation.
[Math. 15]

$$\lambda(n)\tilde{z}'(n)=P'\tilde{Z}(n) \quad (8)$$

It is assumed that the difference of a sampling timing in the ordinary space is equal to a phase difference in a frequency space on the basis of the equation (5) and the equation (8). When the sampling difference is λ(n), it is possible to obtain a depth of the camera projection in the ordinary space. As previously described, when the Fourier transformation of the projection equation in the ordinary space is performed, it is possible to obtain the projection equation in the frequency space.

The important matter is as follows. Although the two cameras project the different 3D points X(t) and X(t') in the ordinary space, it is considered that the two cameras can project the same 3D point Z(n) in the frequency space by considering the projection equation in the frequency equation.

That is, because the same point is projected in the frequency space, there is a correspondence relationship between the points Z(n) and Z(n') in the obtained image, and it is possible to reconstruct the 3D point Z (n) by using asynchronous cameras which will be explained later.

Next, a description will now be given of the 3D reconstruction in the frequency space. As previously described, it is possible to express the projection equation of the two cameras in the frequency space as follows.
[Math. 16]

$$\tilde{z}(n) = P\tilde{Z}(n) \quad (9)$$

$$\lambda(n)\tilde{z}'(n) = P'\tilde{Z}(n) \quad (10)$$

At this time, because the same 3D point Z(n) is projected in the frequency space at the sampling timing n by the two cameras, there is a correspondence relationship between the point Z(n) and Z' (n) on the acquired image. That is, it is impossible to have a correspondence relationship in the ordinary space. On the other hand, it can be understood that there is a correspondence relationship between these points and the reconstruction can be performed in the frequency space.

A description will now be given of this reconstruction method. As previously described, the position detection device 1 according to the present invention has the structure in which the image sampling timings of two cameras are shifted to each other. That is, because the sampling difference $\lambda(n)$ between the two cameras is a known value in the position detection device according to the present invention, the camera matrix P and the camera matrix P' are also known.

A description will now be given of the 3D reconstruction in the frequency space under these conditions. The equation (9) and the equation (10) can be combined as follows.

[Math. 17]

$$\begin{bmatrix} x_f(n) \\ y_f(n) \\ \lambda(n)x'_f(n) \\ \lambda(n)y'_f(n) \end{bmatrix} = \begin{bmatrix} P \\ P' \end{bmatrix} \begin{bmatrix} X_f(n) \\ Y_f(n) \\ Z_f(n) \\ \delta(n) \end{bmatrix} \quad (11)$$

Because the sampling difference is $\lambda(n)$ is a known value, the left term of the equation (11) is a known. Further, because the camera matrixes P and P' are known, it is possible to obtain four values which correspond to three unknown variables $X_f(n)$, $Y_f(n)$ and $Z_f(n)$. That is, it is possible to solve the equation (11) in order to obtain these variables $X_f(n)$, $Y_f(n)$ and $Z_f(n)$.

The equation (11) can be expressed as follows.
[Math. 18]

$$b(n) = MZ(n) \quad (12)$$

It is possible to obtain the 3D point Z (n) as a solution of a least square method by using an inverse matrix $M^{-1}$ of the matrix M as follows.
[Math. 19]

$$Z(n) = M^{-1}b(n) \quad (13)$$

The inverse Fourier transformation of the obtained value Z(n) is performed in order to obtain the 3D point X(t) in the ordinary space, where
[Math. 20]

$$\mathcal{F}^{-1}$$

indicates the inverse Fourier transformation as follows.
[Math. 21]

$$および^{-1}{}_{[Z(n)]=X(t)} \quad (14)$$

The 3D point X(t') which is projected by the second camera can be expressed in the frequency space by using the Fourier transformation as follows.

[Math. 22]

$$\mathcal{F}\left[\tilde{X}(t')\right] = \mathcal{F}\left[\tilde{X}(t-k)\right] = \tilde{Z}(n)e^{-j2\pi\frac{nk}{N}} \quad (15)$$

That is, it is possible to reconstruct the 3D point projected by the second camera by multiplying the previously reconstructed Z (n) and

[Math. 23]

$$\lambda(n)^{-1} = e^{-j2\pi\frac{nk}{N}}$$

together, and the reverse Fourier transformation is performed. This obtains the 3D point X (t') in the ordinary space as follows.
[Math. 24]

$$および^{-1}{}_{[Z(n)\lambda(n)^{-1}]=X(t')} \quad (16)$$

As previously described, it is possible to reconstruct the 3D points projected by the asynchronous cameras which are not synchronized together. Although the ordinary method reconstructs only the 3D point X (t) at a timing t, because the present invention can reconstruct the 3D point X (t') at timing t' by using the asynchronous cameras in addition to the ordinary method, it is possible to perform a high density 3D reconstruction.

When affine cameras are used, it is possible to perform the 3D reconstruction with a double density after the frequency transformation. On the other hand, when projection cameras are used, because the projection cameras provide non-linear data, data obtained by a discrete Fourier transformation of image become different from data projected by using camera matrixes of the 3D data obtained by the discrete Fourier transformation.

However, it is possible to have a correspondence between the projection of the projection cameras and the projection of the affine cameras so long as some conditions are satisfied. As a result, this makes it possible to perform the 3D reconstruction of images of the asynchronous projection cameras through the frequency space. A description will now be given of the method of performing a 3D reconstruction from the images acquired by the projection cameras which are not synchronized together.

When a 3D point X is projected by the two projection cameras which are synchronized to each other, this projection can be expressed as follows.
[Math. 25]

$$\lambda\tilde{x} = P\tilde{X} \quad (17)$$

$$\lambda'\tilde{x}' = P'\tilde{X} \quad (18)$$

where, $\lambda$ and $\lambda'$ are projection depths of these cameras, respectively. In general, these two cameras have a different projection depth. In addition, these projection cameras are arranged so that optical axes of these cameras are parallel to each other and a linear line between the optical axes of the two cameras becomes parallel to the surface of the image. Hereinafter, the arrangement of the cameras previously described will be referred to as the parallel stereo.

In this parallel stereo, a depth (Z coordinate) of the 3D point X viewed from each camera has the same value. That is, the projection depth λ of the first camera and the projection depth λ' of the second camera have the following relationship.
[Math. 26]

$$\lambda = \lambda' \quad (19)$$

This can be understood from a situation in which the third row in the P matrix in the equation (17), and the third row in the P' matrix in the equation (18) have the same value. For this reason, it is possible to rewrite the equation (17) and the equation (18) as follows.
[Math. 27]

$$\tilde{x} = P\tilde{Y} \quad (20)$$

$$\tilde{x}' = P'\tilde{Y} \quad (21)$$

Here, the following equation
[Math. 28]

$$\tilde{Y}$$

(hereinafter, also referred to XY) is obtained by dividing the following equation
[Math. 29]

$$\tilde{X}$$

(hereinafter, also referred to XX) with the projection depth λ.

[Math. 30]

$$\tilde{Y} = \frac{1}{\lambda}\tilde{X} \quad (22)$$

It can be understood from the equation (20) and the equation (21) that the camera matrixes P and P' are the projection camera matrixes in the parallel stereo, and the projection thereof can be expressed by the linear projection model, like the affine cameras. In addition, if YY can be obtained by using the equation (22), it can be understood that XX can be obtained by dividing YY by the fourth row in YY.

That is, in the parallel stereo, YY is estimated by using the linear projection model of the equation (20) and the equation (21) and XX is calculated on the basis of the obtained YY. This makes it possible to perform the 3D reconstruction under the linear projection model, exactly equivalent to the case of these affine cameras. For this reason, the present exemplary embodiment obtains YY instead of XX.

When the two asynchronous cameras are used, the projection to these cameras can be expressed as follows.
[Math. 31]

$$\tilde{x}(t) = P\tilde{Y}(t) \quad (23)$$

$$\tilde{x}'(t') = P'\tilde{Y}(t') \quad (24)$$

It is noted that t and t' indicate different timings. A discrete Fourier transformation of both sides of these projection equations is performed in order to obtain the following equation, like the affine cameras.
[Math. 32]

$$\tilde{z}(n) = P\tilde{Z}_Y(n) \quad (25)$$

$$\lambda(n)\tilde{z}(n) = P'\tilde{Z}Y(n) \quad (26)$$

Here,
[Math. 33]

$$\tilde{Z}_Y(n)$$

(hereinafter, also referred to ZY) is obtained by performing the discrete Fourier transformation of
[Math. 34]

$$\tilde{Y}(t)$$

(hereinafter, also referred to Yt). It is possible to reconstruct ZY by using these equations, exactly equivalent to the case of the case previously described. In addition, Yt can be obtained by performing the reverse discrete Fourier transformation of the reconstructed ZY.

Further, Yt' is calculated by multiplying ZY by λ (n)⁻¹ and performing the reverse discrete Fourier transformation of this multiplication result. Each of the elements in
[Math. 35]

$$\tilde{Y}(t) および \tilde{Y}(t')$$

is divided by the fourth element thereof, respectively, it is possible to Reconstruct
[Math. 36]

$$\tilde{X}(t) および \tilde{X}(t')$$

As previously described, it is possible to realize the 3D reconstruction with high density by using the asynchronous cameras even if these cameras are projection cameras so long as these cameras are arranged in a parallel stereo arrangement.

Effects Obtained by the Present Exemplary Embodiment

In the position detection device 1 as previously described in detail, the calculation section 10 (CPU 11) obtains image coordinate groups of the first acquired image group and the second acquired image group. The image coordinate groups represent coordinates of target objects in each of the acquired images forming the first acquired image group and the second acquired image group. The first acquired image group is composed of a plurality of acquired images obtained at an image acquiring timing in the reference period. This reference period represents a predetermined fixed period. The second acquired image group is composed of a plurality of acquired images obtained at the image acquiring timing in the reference period, and the image acquiring timing of the second acquired images is different from the image acquiring timing of the first acquired images by an asynchronous time.

The calculation section 10 performs a Fourier transformation of each of a first locus and a second locus to obtain a first frequency waveform and a second frequency waveform, respectively. This first locus represents a transition along a time series of the image coordinate group obtained from the first acquired image group. The second locus represents a transition along a time series of the image coordinate group obtained from the second acquired image group. The first frequency waveform is obtained on the basis of the first locus. The second frequency waveform is obtained on the basis of the second locus. The calculation section 10 calculates the position of the target object on the basis of the relationship in which the first frequency waveform and the second frequency waveform are delayed relative to each other by a phase delay corresponding to the asynchronous time.

That is, the position detection device 1 previously described calculates the position of the target object on the basis of the relationship in which each of the frequency waveforms are delayed relative to each other by the phase corresponding to the asynchronous time, where each of the frequency waveforms are obtained by performing the Fourier transformation of the locus of the image coordinate group in each of the acquired image groups obtained at the timings delayed by the asynchronous time. Accordingly, because the position detection device 1 can detect the position of the target object at the timing obtained each of the acquired images, it is possible for the position detection device 1 to detect the position of the target object with high accuracy as compared with the structure configured to detect the position of the target object by using the acquired images which are synchronized together.

In addition, the position detection device 1 calculates a distance to the target object on the basis of the position of the target object. Accordingly, because the position detection device 1 calculates the distance to the target object, it is possible to perform another control on the basis of the distance to the target object.

Further, the position detection device 1 previously described has the plurality of the cameras arranged parallel to each other. The cameras acquire each of the acquired image groups. Even if the position detection device 1 uses projection cameras (in a case of not using affine cameras), it is possible to detect the position of the target object effectively.

Experimental Examples

The inventors according to the present invention performed experiments in order to recognize the effects previously described. The experiments performed the 3D reconstruction in a scene in which an own vehicle approaches a motor vehicle which is stopped.

The experiments will show that it is possible to perform the 3D reconstruction with high accuracy as compared with the conventional stereo method by decreasing the upper limit of the reconstructed frequency when a target 3D motion has a low frequency element.

Figure 5:
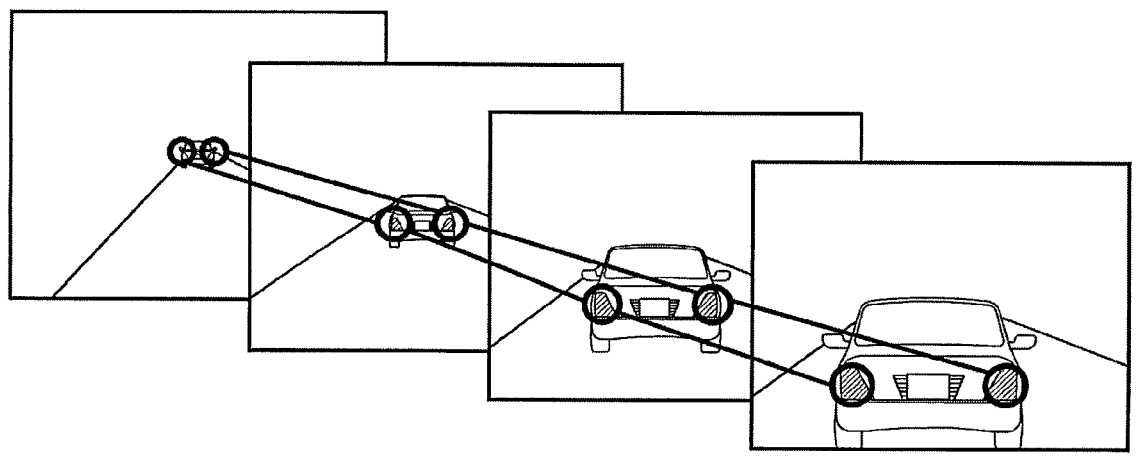
FIG. 5 is an explanation view which arranges image models acquired by an experiment in time series.

Specifically, as shown in FIG. 5, under a severe condition in which the own vehicle approaches a preceding vehicle which drives in front of the own vehicle about several tens of meters ahead, the distance to the preceding vehicle was reconstructed by using stereo cameras having not more than 10 cm of a base length. This reconstruction accuracy was evaluated under such a severe condition.

In the time-series acquired images shown in FIG. 5, the tracking of a left tail light and a right tail light of the preceding vehicle was performed in order to obtain coordinate data of the left tail light and the right tail light. The tracking process used a m×m correlation tracker. Because a size of the lights of the preceding vehicle is drastically changed according to the distance to the preceding vehicle, the tracker size m was changed according to the size of the light. Templates are sequentially switched in order to correctly perform the tracking even if the size of the light was greatly changed.

In order to obtain stable tracking, a five-time moving average at each time is used as a coordinate value. In order to make the same condition in which the cameras having the same frame rates acquired images synchronously and asynchronously, the conventional method used only 30 frames of odd number timings in the images of 60 timings, and the proposed method according to the present invention used 30 frames of odd number timings as the images acquired by the first camera, and 30 frames of even number timings as the images acquired by the second camera.

As previously described, the conventional method made and used the feature point data in 30 frames acquired by the synchronous cameras. Further, the proposed method according to the present invention made and used the feature point data in 30 frames acquired by the asynchronous cameras. Further, the proposed method made a pseudo periodic function, and a front half part of the reconstructed points were used as the reconstruction results because the discrete Fourier transformation of image used a periodic function by using the pseudo periodic function on the basis of data obtained by replicating the obtained linear data.

Figure 6:
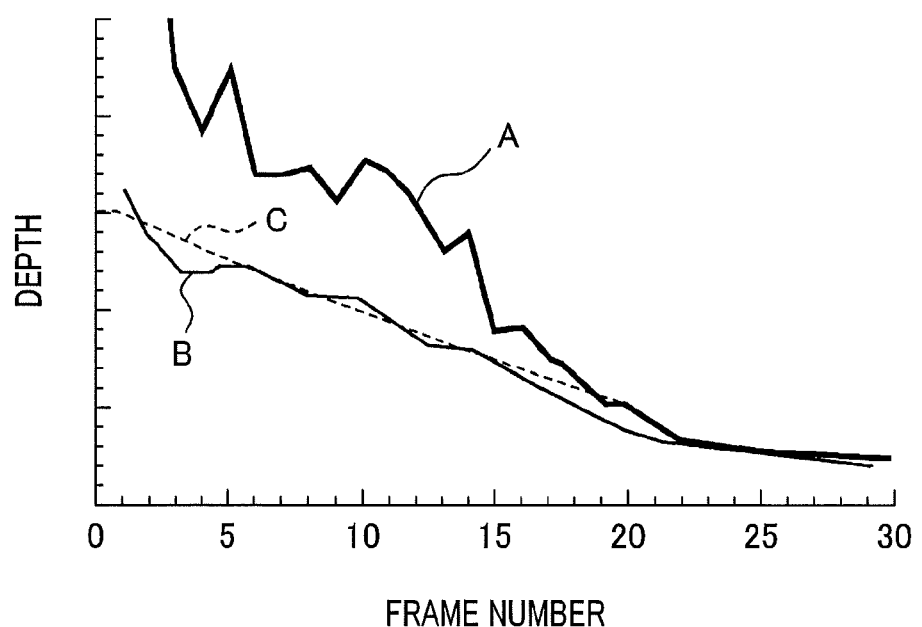
FIG. 6 is a graph showing a relationship between a frame number and a depth (distance) of experimental samples.

Because the feature points in the acquired images to be used in the reconstruction process is shifted just by a half sampling period from each other between the two cameras, the reconstruction process was performed by using the difference value k=0.5. The experiments used the 3D points which are within a range of several meters to several tens of meters. As shown by the Line A in FIG. 6, because the conventional method has the reconstruction result in which the reconstructed frame numbers were greatly scattered in the depth direction, the conventional method did not perform a correct reconstruction. On the other hand, as shown by the Line B in FIG. 6, because the proposed method of the present invention has the reconstruction result in which the reconstructed frame numbers were regularly scattered at regular intervals within a range of several meters to several tens of meters, the proposed method performed a correct reconstruction. Line C shown in FIG. 6 indicates true values (correct depths).

As described above, according to the position detection device 1 and the position and distance detection method of the present exemplary embodiment, it can be understand that stable stereo reconstruction can be performed even if stereo cameras are used in extremely bad conditions.

Second Exemplary Embodiment

Next, a description will be given of the second exemplary embodiment. The present exemplary embodiment (as the second exemplary embodiment) will explain only difference components from the components of the first exemplary embodiment. The same components between the first exemplary embodiment and the second exemplary embodiment will be referred to with the same reference characters and the explanation of the same components is omitted.

The process in S190 according to the first exemplary embodiment shows the method of performing the 3D reconstruction on the basis of the images acquired by the asynchronous cameras. The second exemplary embodiment performs a high density reconstruction over the sampling frequency of these cameras by improving the method previously described.

In more detail, in general, the image acquired by a camera has information regarding X and Y coordinates. When k cameras acquire images at timing M (each M image acquiring period), the number of elements in the frequency area obtained by the Fourier transformation becomes 2KM, and the number of independent frequency elements becomes KM. On the other hand, when there is N time elements of 3D motion as the projection, the number of elements in the frequency area to express the N time elements of 3D motion is 3N, and the independent frequency elements therein is (3/2)N.

Accordingly, when K cameras acquire images at timing M, it can be understood to reconstruct N frequency elements in 3D space, which satisfy the following conditions.

[Math. 37]

$$KM \geq \tfrac{3}{2}N \tag{27}$$

Accordingly, the number N of the frequency elements which can be reconstructed in the 3D space is shown as follows.

[Math. 38]

$$N \leq \tfrac{2}{3}KM \qquad (28)$$

For example, it is possible to reconstruct 3D information containing high frequency elements on the basis of the images acquired by the two cameras at three timings (three image acquiring periods) which correspond to images acquired at four timings. However, because ordinary cameras acquire images of the same 3D point, the obtained information have dependency and difficult to perform the above reconstruction process by using the ordinary cameras. On the other hand, because asynchronous cameras acquire images at different 3D points, respectively, and provide independent information, it is possible to perform the reconstruction of high frequency 3D signals according to the equation (28).

Next, a description will be given of a concrete method of performing a high density reconstruction. When a motion X (t) of a 3D point in a space is composed of 0th order frequency element to N−1th order elements,

[Math. 39]

$$Z(n) = [X_n^f, Y_n^f, Z_n^f]^T \ (n=0, \ldots, N-1)$$

2D images in the real space projected from 3D points Z (n) in the frequency space are expressed by

[Math. 40]

$$x(t) = [x_t, y_t]^T$$

A relationship between the 3D points Z (n) in the frequency space and the 2D images in the real space projected from the frequency space can be expressed as follows.

[Math. 41]

$$\alpha \tilde{x}(t) = P \frac{1}{N} \sum_{n=0}^{N-1} \tilde{Z}(n) e^{2\pi j nt/N} \qquad (29)$$

where α is a scalar variable and indicates a projection depth when image is acquired. When K asynchronous cameras acquire images of 3D points,

[Math. 42]

$$P^i \ (i=1, \ldots, K)$$

the projection to each of the asynchronous cameras can be expressed as follows.

[Math. 43]

$$\alpha^i \tilde{x}^i(t) = P^i \frac{1}{N} \sum_{n=0}^{N-1} \tilde{Z}(n) e^{2\pi j n(t+k_i)/N} \qquad (27)$$

$$(i=1, \ldots, K)$$

where ki indicates a sampling delay to the sampling of the first camera, i.e. $k_1=0$. When the projection equation of the K cameras is expanded,

[Math. 44]

$$f = [X_0^f, \ldots, X_{N-1}^f, Y_0^f, \ldots, Y_{N-1}^f, Z_0^f, \ldots, Z_{N-1}^f, 1]^T$$

it is possible to obtain a linear equation regarding the frequency element of the motion of a 3D point.

[Math. 45]

$$Mf = 0 \qquad (31)$$

where, M is (2kM)×(3N+1) matrix. This (2kM)×(3N+1) matrix is shown as follows.

[Math. 46]

$$M = \begin{bmatrix} L^1(P^1_{11} - P^1_{31}T^1_x) & \ldots & L^1(P^1_{13} - P^1_{33}T^1_x), & L^1 Z_4(P^1_{24} - P^1_{34}T^1_x) \\ L^1(P^1_{21} - P^1_{31}T^1_y) & \ldots & L^1(P^1_{23} - P^1_{33}T^1_y), & L^1 Z_4(P^1_{24} - P^1_{34}T^1_y) \\ \vdots & & \vdots & \vdots \\ L^K(P^K_{11} - P^K_{31}T^K_x) & \ldots & L^K(P^K_{13} - P^K_{33}T^K_x), & L^K Z_4(P^K_{24} - P^K_{34}T^K_x) \\ L^K(P^K_{21} - P^K_{31}T^K_y) & \ldots & L^K(P^K_{23} - P^K_{33}T^K_y), & L^K Z_4(P^K_{24} - P^K_{34}T^K_y) \end{bmatrix}$$

where $Z_4$ is the fourth row in Z (n). $L_i$ is expressed by the following equation.

[Math. 47]

$$\lambda(t,n) = e^{2\pi j nt/N}$$

$L^i$ is M×N matric.

[Math. 48]

$$L^i = \frac{1}{N} \begin{bmatrix} \lambda(0+k_i, 0) & \ldots & \lambda(0+k_i, N-1) \\ \vdots & & \vdots \\ \lambda(M-1+k_i, 0) & \ldots & \lambda(M-1+k_i, N-1) \end{bmatrix}$$

$T_{xi}$ and $T_{yi}$ are vectors having X and Y coordinates of M timings in the images acquired by the i-th camera as expressed by the following equation.

[Math. 49]

$$T_x^i = [x_0^i, \ldots, x_{M-1}^i]^T \qquad (32)$$

$$T_y^i = [y_0^i, \ldots, y_{M-1}^i]^T \qquad (33)$$

The equation (31) shows that the frequency elements of the 3D motion can be expressed by a linear equation by using the images acquired by the asynchronous cameras. Accordingly, when the equation (18) of an inequality is satisfied, it is possible to reconstruct N frequency elements of 3D motions as an eigenvector corresponding to a minimum eigenvalue of M t M on the basis of the asynchronous images at M timing. Mt indicates a transposed matrix of the matrix M.

As previously described, when multiple cameras which are not synchronized to each other acquire images and the images are reconstructed, it is possible to reconstruct 3D motion having a high frequency. On the other hand, the conventional stereo reconstruction method cannot reconstruct such a high frequency 3D motion.

The position detection device according to the second exemplary embodiment obtains frequency elements on the basis of the relationship between the position of the target object in the real space and the frequency elements obtained by the Fourier transformation of the locus of the position of the target object, and calculates the position of the target object on the basis of the obtained frequency elements.

According to the position detection device previously described can obtain more number of the frequency elements, and therefore the position of the target object with high accuracy.

Other Exemplary Embodiments

The subject matter of the present invention is not limited by the first exemplary embodiment and the second exemplary embodiment previously described, and the present invention has various modifications within the technical scope of the present invention.

For example, the method of detecting a position and a distance according to the present invention previously described can apply projection stereo cameras arranged optional locations. In more detail, in a case in which two projection cameras are arranged at optional locations, a plate having four points having known coordinates on a plane is prepared, and the plate is arranged so that a line, through which optical centers of the two cameras are connected together, becomes parallel to this plate, and the two cameras acquire images of the four points on the plate.

A planar projection transformation calculation is performed by using the coordinates of the four points on the plate and the coordinates of the four points on the images acquired by the cameras. This planar projection transformation of the whole images acquired by the cameras makes it possible to virtually arrange the cameras parallel to the plane. The transformed two images become images acquired by cameras arranged in the parallel stereo arrangement by performing the image transformation of the image of each of the cameras.

After performing such a virtual transformation to the parallel stereo arrangement, the reconstruction is performed by the method previously described. This makes it possible to perform the high density reconstruction by using projection stereo cameras in asynchronous state arranged in an ordinary arrangement.

In addition, it is possible to directly apply the previously described method to N multiple cameras. When using projection cameras as the N multiple cameras, it is necessary to arrange optical centers of the N multiple cameras on the same line. So long as the optical centers of these cameras are arranged on the same line, it is possible to make the parallel multiple cameras in which all of the cameras are arrange parallel to each other. Under this state, when the reconstruction is performed by using the frequency area, it is possible to perform high density image reconstruction which is N times the ordinary construction by using N cameras.

Although the position detection device and the method of detecting a position and a distance according to the exemplary embodiments previously described use a plurality of cameras (image acquiring sections), it is possible to use a single camera in order to acquire a plurality of acquired image groups. This single camera is periodically moved such as a circular motion and a reciprocating motion. Further, although the exemplary embodiments previously described explain the cases in which the position detection device 1 is mounted on a motor vehicle, it is possible to arrange it on a desired location in addition to such a motor vehicle.

Relationship Between the Components Used in the Exemplary Embodiments and the Components of the Present Invention The process in step S150 performed by the calculation section 10 in the position detection device 1 according to the exemplary embodiments corresponds to the image coordinate acquiring section of the present invention, and the process in step S190 corresponds to the frequency waveform calculation section and the position calculation section.

Further, the process in step S200 corresponds to a distance calculation section.

REFERENCE SIGNS LIST

1 Position detection device,
10 Calculation section,
11 CPU,
12 Memory section,
21 Image acquiring section,
22 Image acquiring section, and
23 Drive state detection section.

What is claimed is:

1. A position detection device capable of detecting a position of a target object in an acquired image on the basis of a plurality of acquired images acquired by a plurality of projection cameras, comprising:
an image coordinate group acquiring section obtaining an image coordinate group representing a coordinate of the target object in each of the acquired images,
the acquired images forming a first acquired image group and a second acquired image group,
the first acquired image group comprised of a plurality of acquired images which are acquired by a first projection camera in the plurality of projection cameras at a first image acquiring timing every predetermined reference period,
the predetermined reference period representing a predetermined fixed period,
the second acquired image group which is acquired by a second projection camera which is different from the first projection camera at a second image acquiring timing every predetermined reference period,
the image acquiring timing of the second acquired image group being delayed from the image acquiring timing of the first acquired image group by an asynchronous time, and the first acquired image group and the second acquired image group forming a parallel stereo relationship;
a frequency waveform calculation section performing a Fourier transformation of each value obtained by dividing each of a first locus and a second locus by a projection depth of the first projection camera and a projection depth of the second projection cameras, respectively, and calculating a first frequency waveform on the basis of the first locus and a second frequency waveform on the basis of the second locus, the first locus representing a transition along a time series of the image coordinate group obtained from the first acquired image group, and the second locus representing a transition along a time series of the image coordinate group obtained from the second acquired image group; and
a position calculation section obtains a matrix containing a virtual position of the target object on the basis of a relationship between the first frequency waveform and the second frequency waveform which are delayed relative to each other by the asynchronous time, and calculates a position of the target object by dividing the virtual position of the target object with elements in the obtained matrix.

2. The position detection device according to claim 1, further comprising a distance calculation section calculating a distance to the target object on the basis of the position of the target object.

3. The position detection device according to claim 1, wherein the image coordinate group acquiring section acquires the image coordinate group on the basis of each of the first acquired image group acquired by the first projection camera and the second acquired image group acquired by the second projection camera, where the first projection camera and the second projection camera are arranged in parallel to each other.

4. A non-transitory computer-readable storage medium for storing a program for performing a function of the position detection device according to claim 1.

5. A position detection device detecting a position of a target object in an acquired image on the basis of a plurality of acquired images acquired by a plurality of projection cameras, the position detection device comprising:
   an image coordinate group acquiring section obtaining an image coordinate group composed of image coordinates representing a coordinate of the target object in each of the acquired images,
   the acquired images forming a first acquired image group and a second acquired image group,
   the acquired images in the first acquired image group acquired by a first projection camera of the plurality of projection cameras at a first image acquiring timing every predetermined reference period, the predetermined reference period representing a predetermined fixed period,
   the acquired images in the second acquired image group acquired by a second projection camera of the plurality of projection cameras which is different from the first projection camera at a second image acquiring timing every predetermined reference period,
   the second image acquiring timing is delayed from the first image acquiring timing by an asynchronous time; and
   the first projection camera and the second projection camera are arranged in parallel to each other, and the first acquired image group and the second acquired image group forming a parallel stereo relationship;
   a position calculation section calculating a position of the target object on the basis of each of the acquired images in the first image coordinate group and the second image coordinate group and a relationship in image acquiring timing between the first acquired image group and the second acquired image group which are delayed relative to each other by the asynchronous time,
   performing a Fourier transformation of each value obtained by dividing each of a first locus and a second locus by a projection depth of the first projection camera and the projection depth of the second projection cameras, respectively,
   obtaining a first frequency element of the first locus of the position of the target object in a real space on a basis of a relationship between the image coordinates representing the position of the target object in the real space and
   obtaining a second frequency element of the second locus of the position of the target object,
   obtaining a matrix containing a virtual position of the target object on the basis of a relationship between the first frequency element and the second frequency element which are delayed relative to each other by the asynchronous time, and
   calculating the position of the target object on the basis of the obtained first frequency element and the obtained second frequency element with elements in the obtained matrix.

6. The position detection device according to claim 5, further comprising a distance calculation section calculating a distance to the target object on the basis of the position of the target object.

7. The position detection device according to claim 5, wherein the image coordinate group acquiring section acquires the image coordinate group on the basis of each of the acquired image groups acquired by the projection cameras which are arranged in parallel to each other.

8. A non-transitory computer-readable storage medium for storing a program for performing a function of the position detection device according to claim 5.

9. The position detection device according to claim 5, wherein the projection cameras have a non-linear projection model.

10. The position detection device according to claim 5, wherein the projection cameras provide non-linear data.

* * * * *